United States Patent [19]
Anderson

[11] 4,183,066
[45] Jan. 8, 1980

[54] TECHNIQUE FOR RECORDING DATA ON MAGNETIC DISKS AT PLURAL DENSITIES

[75] Inventor: Albert L. Anderson, Lexington, Mass.

[73] Assignee: Digital Equipment Corporation, Maynard, Mass.

[21] Appl. No.: 925,596

[22] Filed: Jul. 17, 1978

[51] Int. Cl.² ............................................. G11B 5/09
[52] U.S. Cl. ...................................... 360/40; 360/43
[58] Field of Search ..................... 360/40, 43, 48, 49

[56] References Cited

U.S. PATENT DOCUMENTS

| | | | |
|---|---|---|---|
| 3,789,377 | 1/1974 | Norris | 360/43 |
| 3,815,122 | 6/1974 | Schwartz et al. | 360/40 |
| 4,129,888 | 12/1978 | Reinholtz | 360/40 |

Primary Examiner—Vincent P. Canney
Attorney, Agent, or Firm—Thomas C. Siekman; Arthur W. Fisher; Richard M. Kotulak

[57] ABSTRACT

A method and apparatus for recording data on a rotating magnetic disk at plural density rates on different areas of the disk is disclosed. The method is particularly useful in magnetic disk recording systems in which the header or control fields of the recorded information are recorded in "single" density FM recording and the data fields of the recorded information are in "double" density modified frequency modulation (MFM) code. The technique involves changing the conventional MFM coding rules to prevent certain data patterns from appearing to the data recording system read circuitry as part of the control fields. In particular, the data pattern 011110 is encoded according to the invention as a data pattern which consists of 000000 with synchronization bits between the first and second, third and fourth, and fifth and sixth data bits. This encoding modification prevents any misinterpretation of the data field as part of a control field. The data recording circuitry used to decode the MFM information is modified from the conventional decoding circuitry so that adjacent "zero" data bits having no synchronization bit between them are decoded as adjacent "one" bits. The original data stream is thereby recovered.

12 Claims, 5 Drawing Figures

TECHNIQUE FOR RECORDING DATA ON MAGNETIC DISKS AT PLURAL DENSITIES

BACKGROUND OF THE INVENTION

1. Field of the Invention

This invention relates to the field of information storage and retrieval and, more particularly, to the recording of binary data on a magnetic medium. The invention is specifically directed to a rotating magnetic disk system in which control and data information is recorded at "single" density and "double" density rates, respectively, on a single disk.

2. Prior Art

Various systems are known in the prior art for recording binary data onto magnetic media. The recording of binary data onto rotating magnetic disks using a sector-track format is conventional. In such systems, magnetic read/write transducers are used to transfer data on to and off of the rotating disk. In order to properly position the read/write transducers, the disk is conventionally divided into a number of concentric rings or "tracks", each having a plurality of distinct segments or "sectors" comprising identifiable regions where data may be recorded. Information is then stored on the disk as a series of magnetic flux reversals, at specific positions within the sectors. Accurate positional synchronization of the read/write transducers with respect to the magnetic disk is therefore required for reliably extracting information from the flux reversals. For this reason, each sector recorded on the rotating magnetic disk is identified to the read/write circuitry by a sector "header" which is a specific portion of the data track that contains unique information enabling the read/write circuitry and the positional mechanism to identify which portion of the disk is being read.

Information recorded in the header and data locations is typically coded for reliable recovery. Presently there are many conventional methods for coding information on rotating magnetic disks. In one of these methods data is recorded utilizing a dual frequency or FM coding scheme. This scheme has been used for many years for recording data on magnetic media. Another well-known arrangement for recording information onto magnetic disks is a modified frequency modulation code or MFM code system. Both arrangements have coding rules which determine the flux patterns recorded on the magnetic media for all patterns of incoming data.

The FM and MFM coding rules cause problems, however, when both coding systems are utilized in the same recording system. Such a situation occurs, for example, in a recording system which records information at plural densities on a single magnetic disk. Such a system is illustratively disclosed in my copending application entitled "Reader for Data Encoded on Magnetic Disks at Plural Densities" Ser. No. 925,534, assigned to the assignee of the present invention and filed on an even date herewith.

In a plural density recording system, the header information may be recorded in "single" density using the FM coding scheme. However, the data information may be recorded at the single density rate or at twice the header information rate or "double" density utilizing the MFM coding technique, which is particularly suited for "double" density recording. One advantage of such a plural density recording system is that magnetic disks which have been coded entirely at the single density rate may be used on the system as well as magnetic disks which have been recorded at plural densities. Hence, users who recorded information on single density recording systems, which were developed first, can use their older single density disks and newer double density recordings on one recording system.

In addition, many manufacturers of rotating disk media, pre-record sector header information in a single density format onto the rotating disk during manufacture. A plural density recording system allows a user of this type of media to merely record his data into the appropriate positions onto the disk in either single or double density. The user does not, therefore, have to purchase disks with header information recorded in double density for double density data recordings.

With some plural density recording systems, however, a problem arises because certain data patterns encoded at the double density rate in the data fields may produce a flux pattern which, when recorded onto the magnetic media, imitates or "aliases" the flux pattern produced by sector header information patterns encoded in single density in the sector header field. This aliasing, of course, causes an erroneous reading of the data on the magnetic disk.

BRIEF SUMMARY OF THE INVENTION

A solution of the foregoing problem and others is provided by one illustrative embodiment of the invention, wherein the normal double density MFM coding rules are changed to prevent data patterns from aliasing portions of the header field pattern.

Specifically, the MFM encoded data pattern, which is modified according to the invention, is the six bit data sequence $\phi 1111\phi$. Advantageously, according to the invention, this pattern is modified by breaking the normal MFM rules, which are well-known, to encode this pattern as $\phi\phi\phi\phi\phi\phi$ with synchronization or "sync" bits between the first and second data bits, the third and fourth data bits, and the fifth and sixth data bits. When this modification is made, the problems of sector and data field aliasing are eliminated. Since, according to the conventional MFM encoding rules, a sync bit is always required between adjacent "zero" data bits this modified data pattern, which contains adjacent "zeroes" without intervening sync bits, is unique.

The data recovery, or decoding circuitry, according to the invention, decodes two adjacent data "zeroes" that do not have a sync bit between them as two adjacent data "ones" thereby recovering the original data pattern.

More specifically, the incoming data stream, which is to be encoded, is shifted into a shift register. Comparator circuitry checks the information stored in the shift register to detect whether the data sequence $\phi 1111\phi$ occurs. When the sequence $\phi 1111\phi$ is detected, the normal MFM encoding circuitry is disabled and special encoding circuitry is enabled. The special encoding circuitry prevents any signal transitions from being recorded on the storage medium during six consecutive bit cells thus encoding the cells as zeroes. However, the special encoding circuitry forces signal transitions at the bit cell boundary between the first and second bit cells, the third and fourth bit cells, and the fifth and sixth bit cells to encode sync bits at these locations.

According to another feature of the invention, the decoding circuitry includes circuitry which derives a timing signal from data read off of the storage medium to define the location of the bit cells. This timing signal is used to separate the recovered data into a data signal which represents recovered data information and a sync signal which represents recovered synchronization information. Both the data signal and the sync signal are shifted into separate three-stage shift registers. Circuitry monitors the first two stages of the register containing the data and generates a signal when two consecutive zeroes are detected. Additional circuitry monitors the first stage of the shift register containing the sync signal and generates an indicator signal when there is no sync bit between the detected consecutive zeroes. In response to the signal indicating consecutive zeroes and to the indicator signal, logic circuitry sets the last two stages of the shift register to indicate or reproduce "ones", thereby recovering the original data stream.

DETAILED DESCRIPTION OF THE PREFERRED EMBODIMENT

In order to understand the nature of the problem and the method of solution of the present invention, it is necessary to understand some of the techniques conventionally used to record binary data on magnetic media. To that end, a short discussion on conventional magnetic coding techniques will follow.

Typically, binary information is encoded on a magnetic media in a serial fashion, that is, bits are recorded in a string in a line along the media. Such a line is called a "track" and may be circular in the case of magnetic disks or linear in the case of magnetic tapes. In order to assure accurate reproduction of the data stored on the media, the data track is divided into a plurality of specified locations in which each bit of data information is written. Clock or synchronizing bits are recorded together with the data to define the location of each bit position or "bit cell". When the data is later read from the magnetic media, the synchronizing information is utilized to develop a "window" in which the read circuitry searches for the data. Typically, in a reading operation a phase lock loop is employed to detect and lock onto the synchronizing information and to generate an internal timing reference so that the desired data may be read from the correct position on the media. A phase lock loop requires that the synchronizing signals be fairly regular and that not too long a time interval elapses between synchronizing or clock bits. Many data coding systems have been developed which provided sufficient synchronization information to insure accurate decoding of the data.

Figure 1:
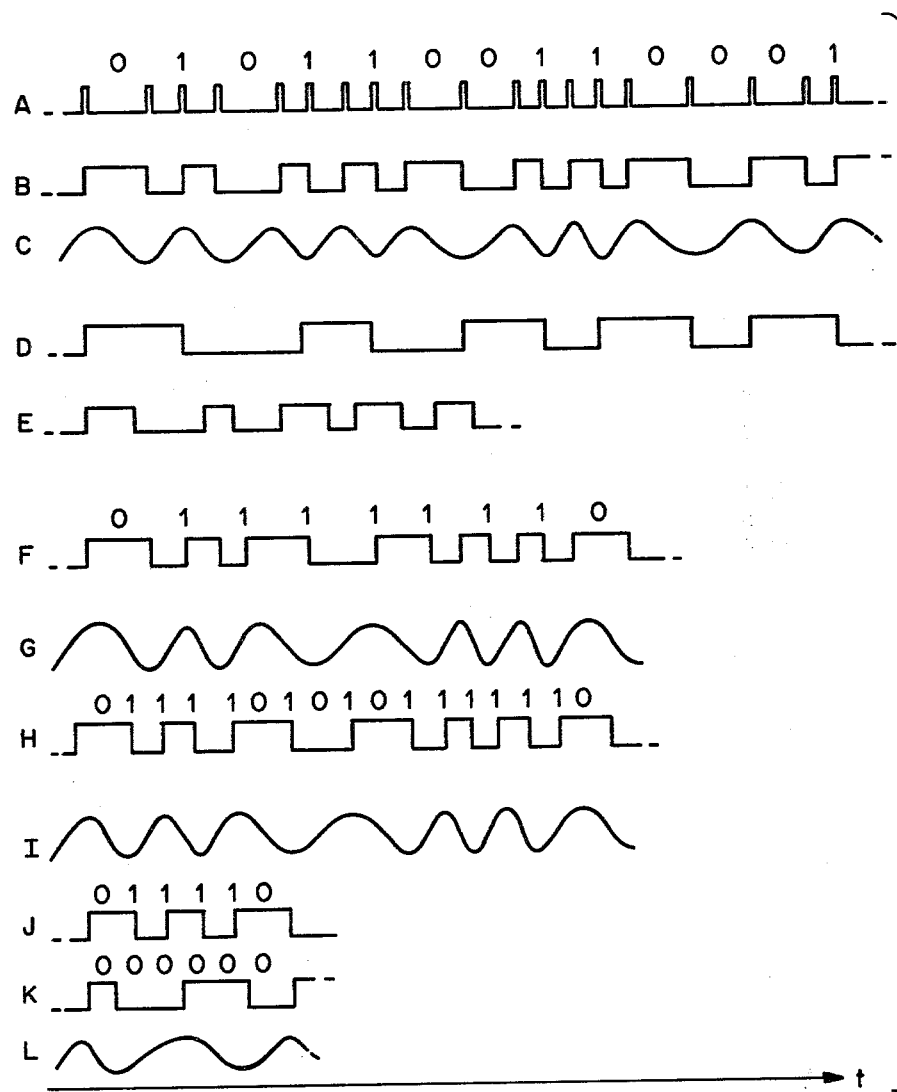
FIG. 1 of the drawing shows electrical waveforms resulting from coding binary information using conventional techniques and the illustrative technique according to the invention.

One such system of encoding data is called a dual frequency or frequency modulated (FM) system. In this type of system, bit cells are defined by sync bits occurring at the boundary of each cell. A data "one" is recorded by a pulse located at the center of a bit cell. A data "zero" is defined by the absence of a pulse at the center of a bit cell. An example of such an encoding scheme is shown in Line A of FIG. 1. In this representation the data information stream $\phi1\phi11\phi\phi11\phi\phi\phi1$ has been encoded in the FM format. In particular type of encoding shown in line A, the signal level returns to zero between information or sync bits. Since data is normally recorded on magnetic media as a series of magnetic flux reversals, this type of system is not generally used in recording data on magnetic media because two flux reversals are required for each information or sync bit. Instead a coding system, such as shown in Line B of FIG. 1, is utilized. In this system each information or sync bit is represented by a single transition in magnetic flux. Between data or sync bits the magnetic flux or signal remains in the same state as it was previously placed. Thus, the signal does not return to the same or "zero" level between bits. For this reason, this type of encoding scheme is known as a non return to zero (NRZ) scheme.

The waveform shown on Line B, however, is highly idealized in that the magnetic transitions are not sharp transitions as shown in FIG. B but rather are spread out pulses which appear somewhat Gaussian in shape. When the data stream shown in Line A is recorded in an actual magnetic media, the transitions and levels are superimposed so that a magnetic transducer reading the information stored on the magnetic disk would develop a signal similar to that shown in Line C of FIG. 1.

The FM NRZ code discussed above works satisfactory when the information recording densities are not high. As the recording density increases, however, the magnetic flux transitions must be moved closer together to accommodate increasing numbers of bits of information in a limited space. As the spacing between the magnetic flux transitions decreases, however, the superposition effects become more severe and distortions also occur because of the proximity of neighboring pulses. With increasing densities eventually the signal distortion becomes so great that reproduction is not reliable. One problem with the FM code in this respect is that a sync bit or flux transition occurs at every bit cell boundary and thus, the number of flux transitions required to encode a given set of data is greater than the number of bits of information present in the data itself.

Other types of FM codes have been developed in which some of the sync bits are omitted. However, as discussed above decoding circuitry which utilizes a phase-locked loop to recover the synchronization information cannot tolerate too many missing sync bits before decoding becomes unreliable.

Consequently, many other data encoding schemes have been developed which eliminate most of the sync bits, thereby allowing the information bits or transitions to be placed closer together. One of these arrangements is called Modified Frequency Modulation (MFM) coding. According to the conventional rules used to encode information with this type of code, the sync bits which appear at the bit cell boundaries in the FM code are eliminated. A data "one" bit is coded by a transition occurring at the center of the bit cell and a "zero" bit is coded by an absence of a transition occurring at the center of the bit cell. In order to prevent the interval between transitions from becoming too long, thereby allowing the phase lock loops which are used to recover the information to becomes synchronized, sync bits or transitions are inserted at the bit cell boundary between adjacent zero bits. The coding of the aforementioned data pattern in this type of coding arrangement is shown in Line D of FIG. 1.

An examination of Line D and Line B will show that the shortest interval between transitions in Line D (which occurs between adjacent ones), is exactly twice the shortest interval in Line B. This fact allows the transitions which encode the data stream to be moved closer together without causing any more additional distortion problems than are caused in the FM coding scheme. Thus, as shown in line E twice as much data may be coded in the same space as shown in Line D of FIG. 1 using the FM coding scheme. Consequently, this type of coding scheme is often used in so called "double" density systems.

When either the FM coding system is used alone or the MFM coding system is used alone, there is no problem with confusion between bit patterns, since each bit pattern produces a uniquely recognizable flux pattern encoded on the magnetic media surface. In some systems, however, the FM and MFM coding schemes are used together on the same media surface and as part of the same recorded document. Such a system, for example, is shown in my co-pending application entitled "Reader for Data Recorded On Magnetic Disks at Plural Densities", Ser. No. 925,534, filed on an even date herewith and assigned to the assignee of the present invention. In such a system, it is possible for data encoded in one coding scheme to produce a flux pattern which is the same as different data encoded in another different coding scheme. Since both coding schemes are used on the same record, this presents a difficulty if the information which has been coded is not equivalent.

In the illustrative system mentioned above, such a problem does occur. Specifically, in the sector header information which identifies to the read/write circuits which area on the disk is being read the pattern 1111111$\phi$ is encoded in FM code. Normally, in FM coding, sync bits are placed at each boundary of the bit cells, but sync bits are sometimes omitted where a unique code is needed, such as in headers. For example, in a header pattern commonly used and well-known to those in the art, sync bits are omitted between the second and third, third and fourth, and fourth and fifth bit cells. With sync bits in appropriate places, the code pattern appears as Line F in FIG. 1. In a commonly used notation called hexadecimal notation this combination is known as an "FE" data byte with a C7 sync byte. Specifically, in hexadecimal notation a single digit from zero to nine or a letter from A to F is used to represent a set or byte of four binary digits in accordance with the pattern shown in Table 1.

TABLE 1

| Binary Notation | Hexadecimal Notation |
| --- | --- |
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | A |
| 1011 | B |
| 1100 | C |

TABLE 1-continued

| Binary Notation | Hexadecimal Notation |
| --- | --- |
| 1101 | D |
| 1110 | E |
| 1111 | F |

Using this notation, the data pattern shown in Line F of FIG. 1, corresponds to a data byte of FE$_{hex}$ and a corresponding sync byte of C7$_{hex}$. When this data pattern is encoded using an NRZ format, a flux pattern shown in Line G on the magnetic media results.

If, on the same record, a data pattern $\phi$1111$\phi$1$\phi$1$\phi$111111$\phi$ appears coded in double density MFM format, such as shown in Line H in FIG. 1, a flux pattern, such as shown I in FIG. 1, results in the magnetic media. An examination of the flux pattern shown in Lines G and I will reveal that the flux pattern in Line I is equivalent to the flux pattern in Line G shifted by one quarter of a bit cell to the left. Thus, an incorrect mapping or aliasing occurs and the data will be incorrectly interpreted by the reading system.

Advantageously, according to the invention, this problem is avoided by modifying the normal MFM encoding rules. Specifically, the data pattern $\phi$1111$\phi$ (shown in Line J of FIG. 1 encoded in the normal MFM encoding pattern) appearing in the data fields of the magnetic disk is encoded instead as the pattern $\phi\phi\phi\phi\phi\phi$ with the sync bits between the first and second, third and fourth, and fifth and sixth data bits as shown in Line K of FIG. 1. A flux pattern such as shown in Line L of FIG. 1 results from such a modification. When this flux pattern replaces the flux pattern at the beginning portion of Line I, a unique coding results obviating the aliasing problem previously described.

Figure 2:
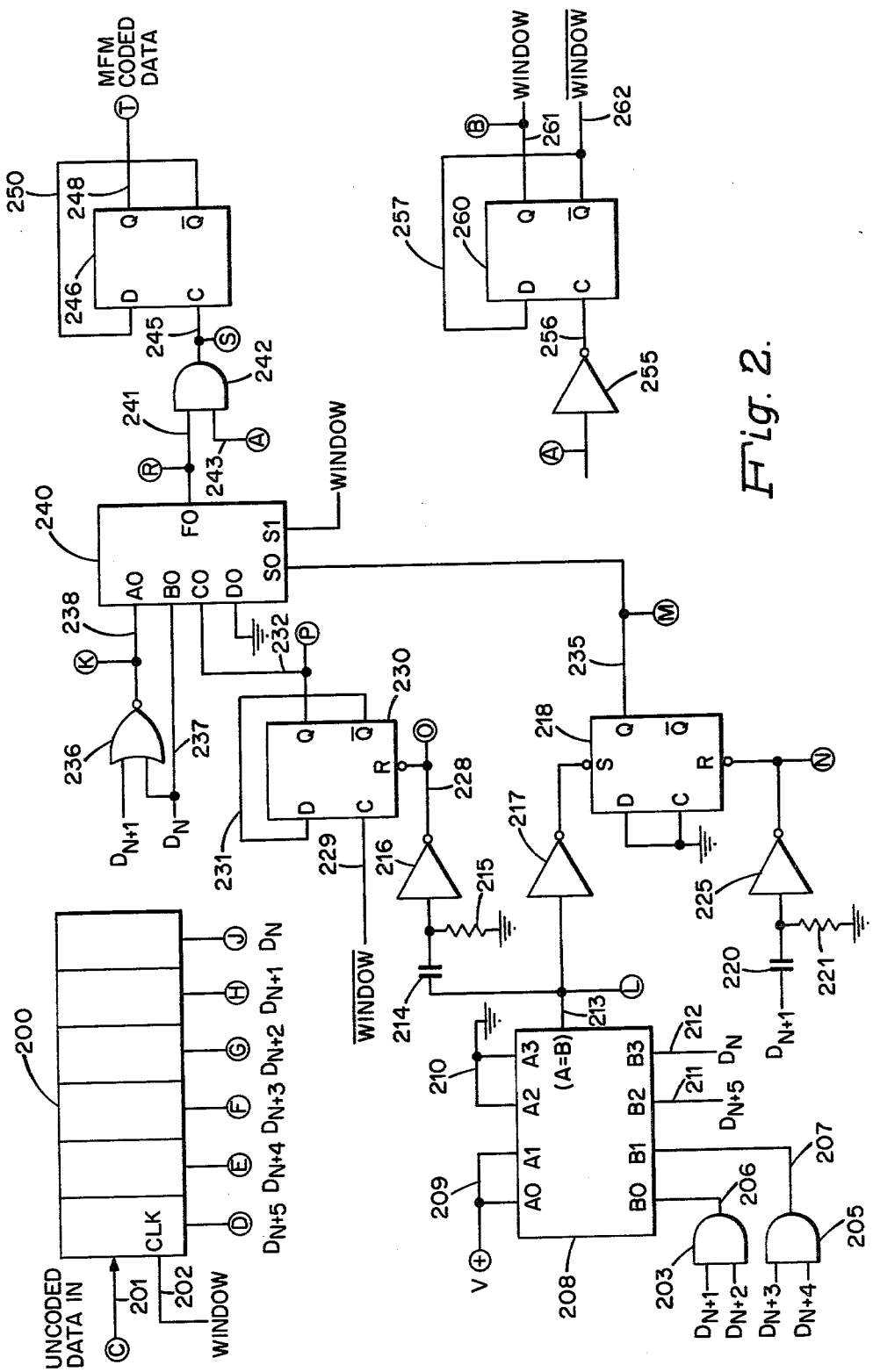
FIG. 2 of the drawing shows an illustrative circuit for encoding data according to the principles of the invention.
Figure 3:
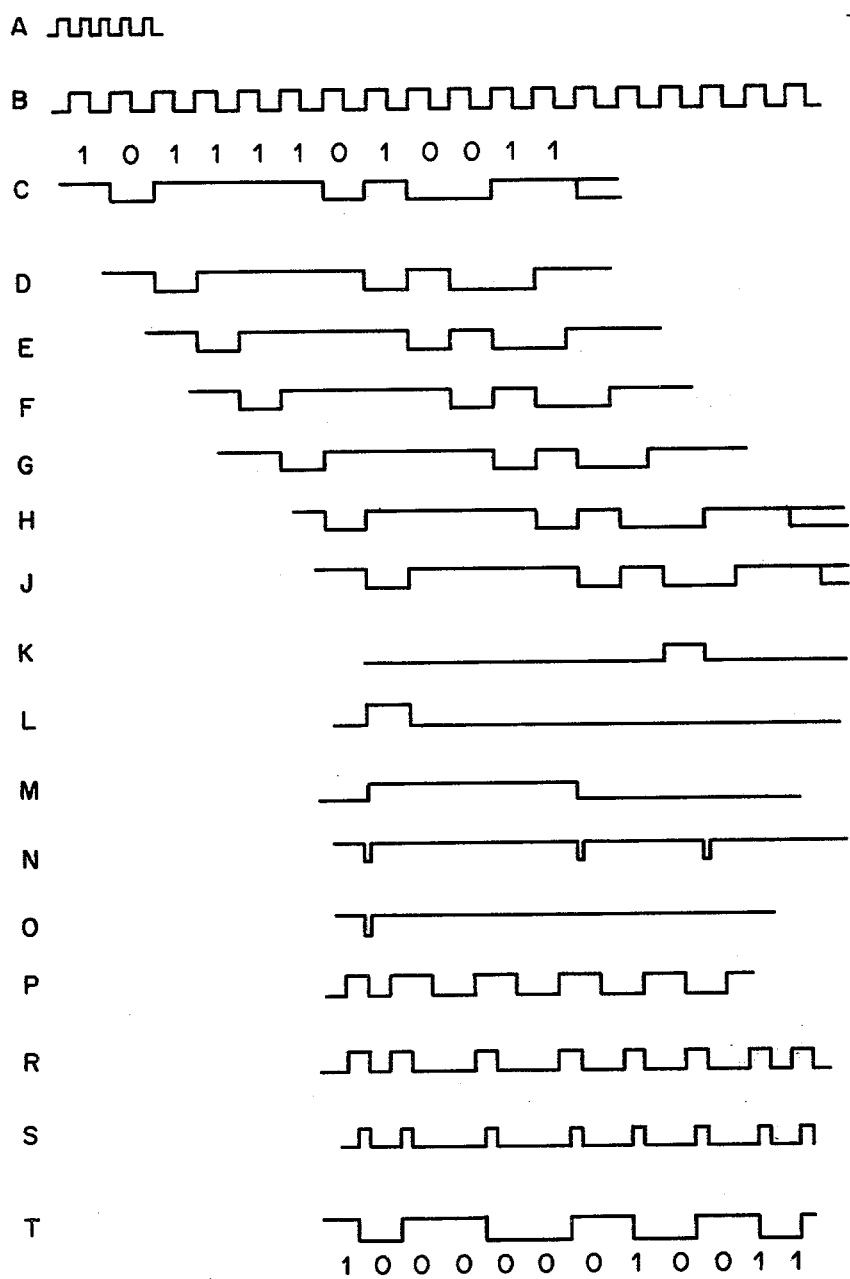
FIG. 3 of the drawing shows selected electrical waveforms produced by the operation of the circuitry shown in FIG. 2.

An illustrative circuit which encodes data according to the principles of this invention is shown in FIG. 2. This circuitry normally encodes incoming data utilizing the normal MFM encoding arrangements, however, it also recognizes the incoming data pattern $\phi$1111$\phi$ (which is encoded according to the principles of this invention as the pattern $\phi\phi\phi\phi\phi\phi$ with sync bits between the first and second, the third and fourth, and the fifth and sixth data bits). In order to more fully understand FIG. 2, electrical waveforms at various points of the circuit indicated by circled letters are shown in FIG. 3.

The circuitry shown in FIG. 2 is synchronized by a clock signal provided by the data processing circuitry which generates the incoming data. This clock signal (which is shown in Line A of FIG. 3) is a square waveform which has a frequency such that two cycles of the waveform are equivalent to a single bit cell.

The incoming clock signal is divided down by flip-flop 26$\phi$ into a "WINDOW" signal which is used to gate data into the encoding apparatus. Specifically, the clock signal is provided to the input of inverter 255 which in turn applies, via lead 256, an inverted clock signal to the clock input of flip-flop 26$\phi$. Flip-flop 26$\phi$ is a well known D type flip-flop which responds to the rising edge of a signal applied to its clock input to change the state of its Q output to the state of the signal present at the D input immediately previous to the rising signal edge received at the clock input. Flip-flop 26$\phi$ has its $\overline{Q}$ output connected to its D input via lead 257 and therefore changes its state (or toggles) upon each rising edge received at its clock input. The WINDOW sinal developed at the output 261 of flip-flop 26$\phi$ is shown in FIG. 3, Line B, and appears as a square wave with frequency one half that of the clock signal. In addition, a "WINDOW" signal is produced from the $\overline{Q}$ input of flip-flop $26\phi$ on output 262.

The WINDOW signal derived from flip-flop $26\phi$ is utilized to gate incoming data into shift register $2\phi\phi$. Specifically, uncoded data from data processing circuitry (not shown) is provided to shift register $2\phi\phi$ via lead $2\phi 1$. This data assumes the form shown in Line C of FIG. 3. That is, the "zero" bit states are represented by low values of the signal for a duration of one bit cell and the "one" bit states are represented by high values of the signal for a duration of one bit cell.

Shift register $2\phi\phi$ has six stages which are shifted in sequence by the WINDOW signal provided on lead $2\phi 2$ to its clock input. Shift register $2\phi\phi$ is connected internally so that on each rising edge of the WINDOW signal applied to the clock input, the signal present in each stage is shifted to the stage immediately to its right. Therefore, during operation of the circuitry the outputs $D_{N+5}$ though $D_N$ of the shift register represent six consecutive bits in the incoming data stream as shown in lines D through J of FIG. 3.

Encoding of the data according to the normal MFM encoding rules is accomplished by NORgate 236, multiplexer $24\phi$, ANDgate 242 and flip-flop 246. Specifically, the outputs $D_N$ and $D_{N+1}$ of shift register $2\phi\phi$, which represent two consecutive bits in the incoming data stream, are applied to the inputs of NORgate 236. NORgate 236 will therefore produce a high signal at its output 238 only when the two consecutive bits $D_{N+1}$ and $D_N$ are both "zeroes" as shown in Line K of FIG. 3. The output $D_N$ of shift register $2\phi\phi$ is also provided to the D$\phi$ input of multiplexer $24\phi$ via lead 237. Multiplexer $24\phi$ is a well-known circuit device that has four inputs, A$\phi$, B$\phi$, C$\phi$, and D$\phi$ and an output F$\phi$. Any one of inputs A$\phi$ through D$\phi$ may be selectively connected to output F$\phi$ by the internal action of multiplexer $24\phi$ operating under control of signals appearing at address input S$\phi$ and S1. Table 2 shows the selective connection of inputs A$\phi$ through D$\phi$ corresponding to various signals present at address inputs S$\phi$ and S1.

TABLE 2

| S$\phi$ | S1 | INPUT CONNECTED TO OUTPUT F$\phi$ |
|---|---|---|
| $\phi$ | $\phi$ | A$\phi$ |
| $\phi$ | 1 | B$\phi$ |
| 1 | $\phi$ | C$\phi$ |
| 1 | 1 | D$\phi$ |

Address input S$\phi$ of multiplexer $24\phi$ is connected via lead 235 to the Q output of flip-flop 218. Flip-flop 218 is reset during the normal MFM encoding operation and therefore input S$\phi$ of multiplexer $24\phi$ receives a low signal. Input S1 of multiplexer $24\phi$ is connected to the WINDOW signal generated via flip-flop $26\phi$. Therefore, as the window signal changes value from zero to one, therefore the address present at inputs S$\phi$ and S1 of multiplexer $24\phi$ changes from $\phi\phi$ to $\phi 1$. Accordingly, when the WINDOW signal generated by flip-flop $26\phi$ is low, input A$\phi$ of multiplexer $24\phi$ is connected to output F$\phi$ and when the WINDOW signal is high, input B$\phi$ is connected to output F$\phi$ of multiplexer $24\phi$. Output $D_N$ of shift register $2\phi\phi$ is thereby sampled when the WINDOW signal is high and the output of NORgate 236 is sampled when the WINDOW signal is low.

Output F$\phi$ of multiplexer $24\phi$ is connected via lead 241 to the upper input of ANDgate 242. The lower input of ANDgate 242 is connected to the clock signal shown in Line A of FIG. 3 via lead 243. ANDgate 242 therefore gates the output of multiplexer $24\phi$ during the high portion of the clock input and prevents signal transients developed by multiplexer $24\phi$ from improperly propagating through the circuitry. The output of ANDgate 242 is provide via lead 245 to the clock input of flip-flop 246. Flip-flop 246 has its $\overline{Q}$ input connected via lead $25\phi$ to its D input and therefore changes state on each rising edge of the signal applied to its clock input. The Q output 248 of flip-flop 246 provides the MFM coded output data. This data is provided to well-known circuitry for recording the data onto a storage medium which might illustratively be a magnetic disk or tape. Such recording circuitry typically contains amplifiers, logic and a magnetic transducer to record signal transitions onto the storage medium representing the encoded data.

During normal MFM encoding operations, assuming that the consecutive incoming data bits present at outputs $D_{N+1}$ and $D_N$ of shift register $2\phi\phi$ are not zeroes, the value of the data bit present at shift register $2\phi\phi$ output $D_N$ is applied, via multiplexer $24\phi$, to the upper input of ANDgate 242 when the WINDOW signal is high. During the high portion of the clock signal ANDgate 242 is therefore enabled and the value of the data bit present at output $D_N$ of shift register $2\phi\phi$ is applied to the clock input of flip-flop 246. If the value of the data bit is high indicating an incoming "one" bit, flip-flop 246 will be toggled to change state, providing a signal transition in the output. If the value of the data bit is low, indicating a ¢zero" bit, flip-flop 246 will not toggle, producing no transition. If the value of the data bits appearing at outputs $D_{N+1}$ and $D_N$ of shift register $2\phi\phi$ are both "zeroes", then NORgate 236 is enabled and a high signal is applied to the output F$\phi$ of multiplexer $24\phi$ when the window signal is low. At the next high portion of the clock signal, ANDgate 242 is enabled to toggle flip-flop 246 producing a transition at the bit cell boundary.

Operation continues in this manner for normal MFM coding until the data pattern $\phi 1111\phi$ appears in the incoming data stream. When this pattern is shifted into shift register $2\phi\phi$, low signals are produced at outputs $D_{N+5}$ and $D_N$ and high signals are produced at outputs $D_{N+4}$ through $D_{N+1}$. These signals are provided to comparator $2\phi 8$.

Comparator $2\phi 8$ is a well-known logic device which compares the logical values of two four-bit digital words. Specifically, when the values of the signals appearing at inputs A$\phi$ through A3 equal the value of signals appearing at inputs B$\phi$ through B3 respectively, a high signal is produced on output 213 of comparator $2\phi 8$. Inputs A$\phi$ and A1 are connected to a positive voltage source via lead $2\phi 9$ to produce a high signal thereon. Inputs A2 and A3 are connected to ground via lead $21\phi$ to produce a low signal thereon. Therefore, output 213 of comparator $2\phi 8$ will be high only if inputs B$\phi$ and B1 are one and inputs B2 and B3 are $\phi$ respectively. This pattern only occurs when the data pattern $\phi 1111\phi$ is present in shift register $2\phi\phi$ and low signals are provided to inputs B2 and B3 (via leads 211 and 212 respectively) and ANDgates $2\phi 3$ and $2\phi 5$ receive high signals at their inputs and in turn apply high signals to inputs B$\phi$ and B1 of comparator $2\phi 8$ (via leads $2\phi 6$ and 2φ7 respectively). A high signal, as shown in Line L of FIG. 3, is thereupon produced by comparator 2φ8.

Advantageously, according to the principles of my invention, additional circuitry is provided to encode the income data stream φ1111φ as a sequence of six bit cells having no transitions therein and with signal transitions appearing at output 248 of flip-flop 246 between the first and second bit cells, the third and fourth bit cells and the fifth and sixth bit cells.

Specifically, the high output on lead 213 produced by comparator 2φ8 is applied as a low signal by inverter 217 to the set input of flip-flop 218. Flip-flop 218 is thereby set to produce a high signal at its output Q which is applied via lead 235 to the S0 input of multiplexer 24φ as shown in Line M of FIG. 3. This high signal indicates that the special sequence to be encoded according to the principles of the invention has been detected, and when this signal is applied to multiplexer 24φ either input Cφ or input Dφ will be connected to output Fφ depending on the state of the WINDOW signal applied to input S1. Input Cφ of multiplexer 24φ receives a signal derived from flip-flop 23φ which changes state at the beginning of each bit cell. In order for a high signal to be applied to flip-flop 246 via lead 245 by ANDgate 242 the ouput of flip-flop 23φ must be high, the WINDOW signal must be low and the clock signal must be high simultaneously. This condition only occurs every other bit cell boundary. During the high portion of the WINDOW signal the low signal present at input Dφ of multiplexer 24φ (which is grounded) is applied to ANDgate 242 to disable it; therefore flip-flop 246 does not toggle and no signal transitions result.

Specifically, a high signal on output 213 of comparator 2φ8 which indicates that the incoming data sequence φ1111φ has been detected is applied to a differentiator consisting of capacitor 214, resistor 215 and inverter 216. The output of inverter 216 is normally held high by a low signal applied to its input via resistor 215; however, when a high signal appears on lead 213, the input of inverter 216 is momentarily pulled high via capacitor 214. A short low pulse is therefore produced at the output 228 of inverter 216 as shown in line O of FIG. 3. This short negative pulse is applied to the reset input of flip-flop 23φ to reset it assuring that the flip-flop begins operation in the proper state. Flip-flop 23φ is a D-type flip-flop having its $\overline{Q}$ output connected to its D input via lead 231. Flip-flop 23φ therefore changes state on each rising edge of the WINDOW signal (inverted), which is applied to the clock input of flip-flop 23φ via lead 229.

The output of flip-flop 23φ, applied to flip-flop 246 by means of multiplexer 24φ and ANDgate 242 provided signal transitions on every other bit cell boundary as described above. Operation continues in this manner for bit cell periods at which time the "zero" at the end of the incoming data sequence φ1111φ has propagated in shift register 2φφ so that a low signal is present at output $D_{N+1}$ of shift register 2φφ. The resulting low to high transition to applied to the differentiator connecting of capacitor 22φ, resistor 221 and inverter. Responsive to the transient a low pulse is applied to the reset input of flip-flop 218, resetting it and returning the circuit to the normal MFM encoding operation.

In addition, according to the invention, circuitry is provided in the read decoding circuitry which decodes the data bit sequence φφφφφφ (encoded in MFM format) as a data bit sequence of φ1111φ. To do this the circuitry decodes adjacent "zeroes" which are not separated by a sync bit or transition as adjacent data "ones". An illustrative example of such circuitry is shown in FIG. 4 which will be explained in detail below.

Figure 4:
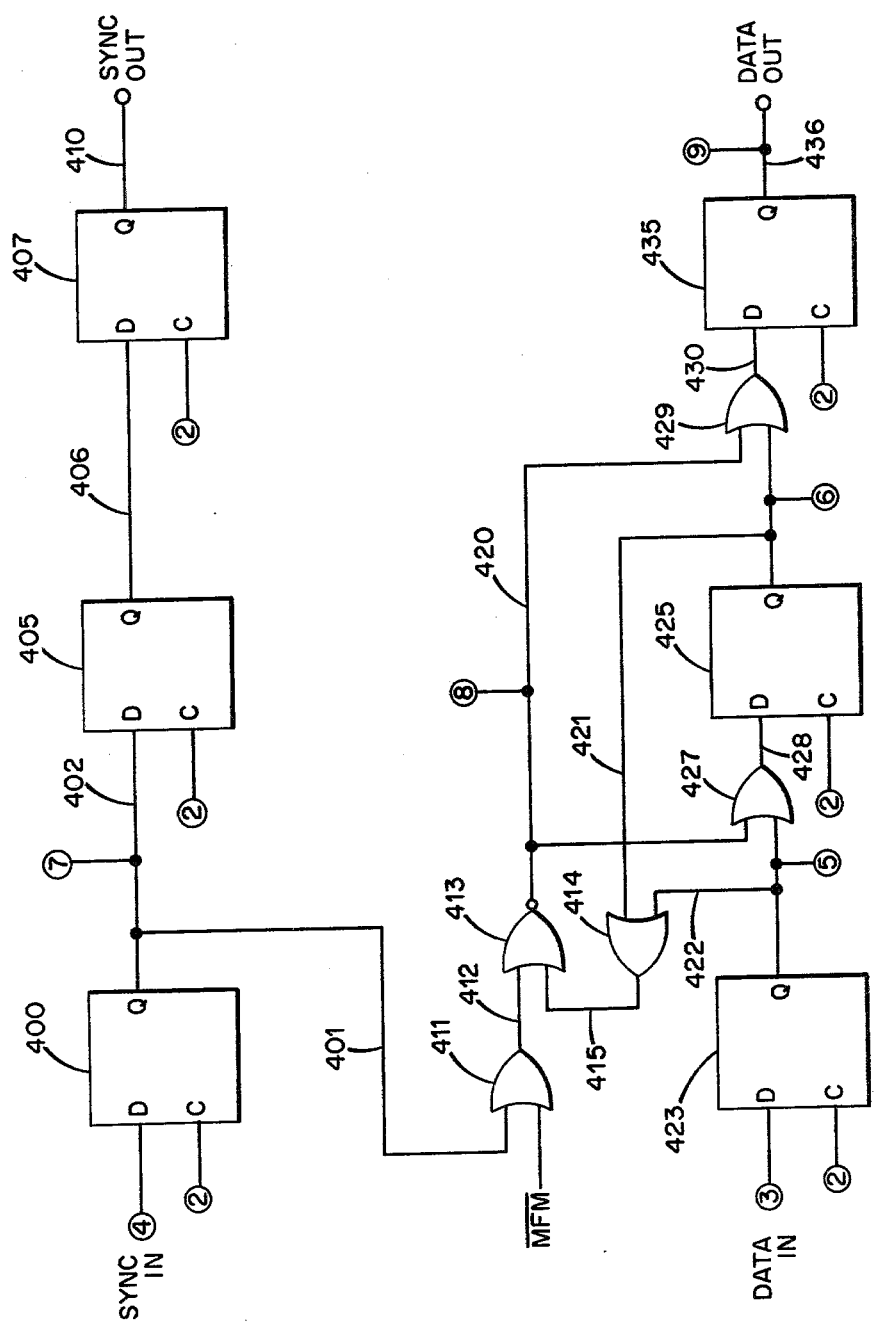
FIG. 4 of the drawing shows an illustrative decoding circuit.
Figure 5:
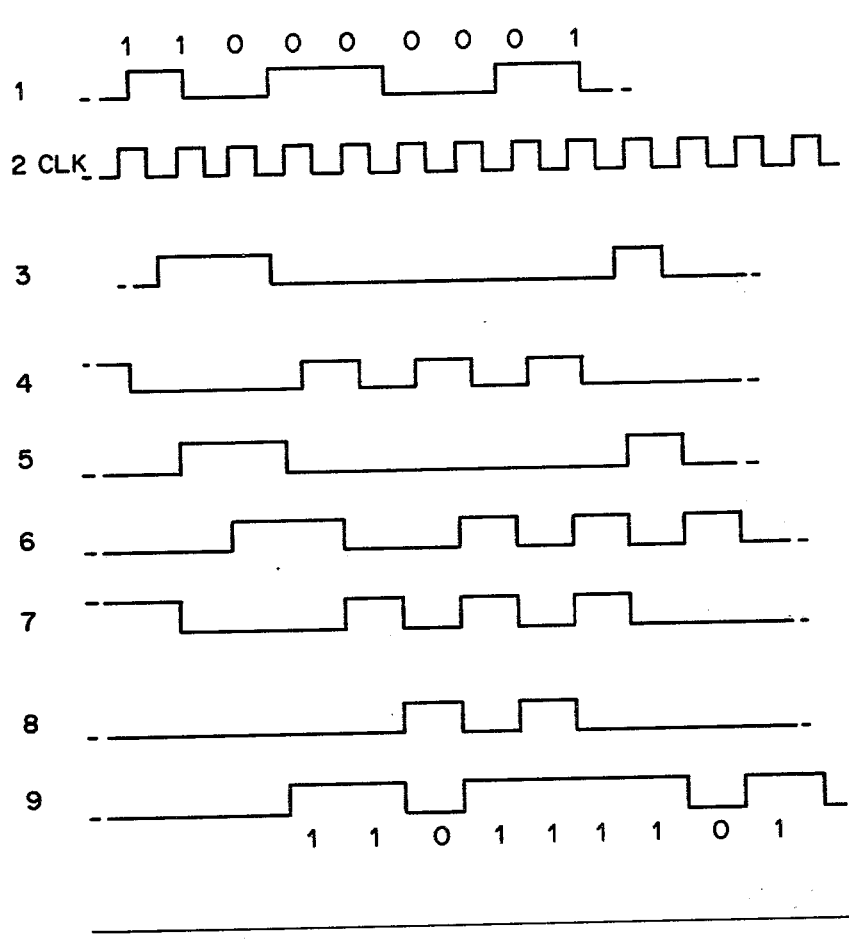
FIG. 5 of the drawing shows electrical waveforms produced during the operation of the circuitry shown in FIG. 4.

FIG. 5 shows various waveforms developed by the circuitry in processing the data bit stream 11φφφφφ1 encoded using the modified MFM encoding arrangement. This data stream would result from the binary information stream 11φ1111φ1 encoded according to the principles of this invention. The data is encoded as shown in Line 1 of FIG. 5. The remaining waveforms shown on the numbered lines of FIG. 5 appear at the points denoted by the corresponding circled numbers in FIG. 4. Proper operation of the decoding circuitry would decode the pattern 11φφφφφ1 as the original pattern 11φ1111φ1.

As shown in FIG. 4, the circuitry consists basically of two flip-flop chains. One flip-flop chain, containing D-type flip-flops 4φφ, 4φ5 and 4φ7, processes the sync bit information. The other flip-flop chain consisting of D-type flip-flops 423, 425, and 435 processes the data bit information. In operation, the sync and data bit enter at the left hand side of the flip-flop chains and are transferred from flip-flop to flip-flop in the chain in synchronism with a clock signal synchronized with the bit cells. As the respective data and sync bits move through the flip-flop chains, a combination of logic gates detects the occurrence of a combination consisting of two data bits with no sync bit between them. When this sequence appears, the appropriate data bits are forced to "ones" so that the modified pattern is decoded to produce the correct data pattern.

Specifically, each of flip-flops 4φφ, 4φ5, 4φ7, 423, 425, and 435 is provided at its clock input with a signal shown in Line 2 of FIG. 3. This clock signal is the window signal utilized by the decoding system to detect data and sync bits. The clock signal is derived from conventional phase-lock loop circuitry which is well-known in the art and has a high "window" signal centered about the middle of the bit cell. For details of an improved phase lock loop circuit, see my co-pending application referenced above which is hereby included by reference herein.

D-type flip-flops 4φφ, 4φ5, 4φ7, 423, 425, and 435 are positive-edge triggered. That is, the output Q of each flip-flop changes to the value present at the D input on the positive edge of the signal applied to the clock input C. Flip-flop 423 receives at its D input signals representing the incoming data bit stream while flip-flop 4φφ receives its D inputs signals representing the incoming sync bit stream. Well-known circuitry is used to decode the incoming MFM signals recovered from the read circuitry. Other conventional circuitry separates the data information from the sync information present in the incoming data stream. The decoding and separation circuitry produces a data bit stream in which each "one" bit is represented by a high signal having a duration of one bit cell and each "zero" is represented by a low signal having a duration of one bit cell. The synchronization and processing circuitry also causes the data bit pattern to be delayed from the incoming data stream by approximately one half of a bit cell. In a similar manner, the processing circuitry separates out the sync bits and produces a synchronization signal having a high value for each sync bit present which high value lasts for approximately one bit cell interval. The synchronization signal also has a delay of approximately one half of a bit cell due the processing time.

Accordingly, the data signal consisting of a data stream 11φφφφφ1 is applied to the D input of flip-flop 423 as shown in line 3 of FIG. 5 and a synchronization signal input consisting of the stream φφ1φ1φ1φ is applied to the D input of flip-flop 4φφ as shown in line 4 of FIG. 5. Circuitry for decoding, separating, synchronizing and processing the data and synchronization information is shown in more detail in my aforementioned co-pending application.

As mentioned previously, each flip-flop produces a signal at its Q output equivalent to the signal present at its D input at the rising edge of the clock signal. Thus, the output of flip-flop 423 is shown in line 5 on FIG. 5 is equivalent to the input as shown on line 3 but synchronized to the rising edge of the clock signal shown in line 2. Similarly the output of flip-flop 4φφ as shown in line 7 is equivalent to the input of flip-flop 4φφ as shown in line 4 synchronized to the rising edge of the clock signal in line 2.

Since flip-flops 423, 425, and 435 are connected in series, the outputs of flip-flops 425 and 435 would be equivalent to the output of flip-flop 423 delayed by one or two bit cell intervals respectively if it were not for the logic circuitry consisting of ORgates 427, 429 and 414 and NORgate 413. These logic gates detect a condition in which there are two consecutive "zero" data bits with no sync bit at the bit cell boundary between the "zero" bits.

Specifically, since the data bits are shifted serially into the flip-flop chains 423, 425 and 435 the outputs of adjacent flip-flops at any given point and time will signify the value of consecutive data bits. The outputs of flip-flops 423 and 425 are applied via leads 422 and 421 respectively to ORgate 414. When the outputs of both flip-flops 423 and 425 are low signifying adjacent "zero" bits, low signals will be applied to both inputs of ORgate 414 which in turn applies a low signal via lead 415 to the lower input of NORgate 413. This low signal signifies that consecutive zeroes have been received. NORgate 413 receives at its upper inputs, via lead 412, an input from ORgate 411. ORgate 411 in turn receives, via lead 4φ1, the output of flip-flop 4φφ which is an indication of the intervening sync bit between the data bits stored in flip-flops 423 and 425. ORgate 411 also receives a signal at its lower input which is low when the circuitry is decoding MFM encoded words. A high signal present at the lower input of ORgate 411 disables the decoding circuitry to prevent an improper decoding when data encoded in the FM format is passed through the decoding apparatus.

NORgate 413 therefore receives low signals at both its inputs only when the outputs of flip-flops 423, 425, and 4φφ are low. This pattern only occurs when two consecutive "zero" bits are detected which do not have a sync bit at the bit cell boundary between them. As shown in FIG. 5, the pattern occurs when the signals shown in lines 5, 6, and 7 representing the outputs of flip-flops 423, 425, and 4φφ respectively are simultaneously zero. At that time, NORgate 413 produces a high signal at its output as shown in line 8 of FIG. 5 for setting the appropriate stored bits to "ones".

A high output of NORgate 413 is applied via lead 42φ to ORgates 427 and 429 which set or force the inputs to flip-flops 425 and 435 to "one" via leads 428 and 43φ. The "zero" bits stored in flip-flops 423 and 425 represented by low outputs signals are shifted into flip-flops 425 and 435 respectively as "one" bit signals due to the high signals applied to ORgates 427 and 429 via NORgate 413. Thus, consecutive "zero" bits, not separated by a sync bit, propagate through the data flip-flop chain as consecutive "ones".

Referring to line 1 of FIG. 5, a condition consisting of consecutive "zero" bits not separated by a sync bit occurs between the second and third zeroes and the fourth and fifth zeroes. As described above when this data stream is passed through the decoding circuitry described, the second and third, fourth and fifth "zeroes" will propagate through as "ones" resulting in a data pattern of 11φ1111φ1 as shown in line 9 of FIG. 5 as the output 436 of flip-flop 435. Thus, an incoming sequence encoded according to the principles of this invention is decoded by the illustrative inventive circuitry as the original data stream.

Although only one illustrative embodiment is shown of the invention, the principles described herein are obviously applicable to other decoding arrangements utilizing similar logic circuitry. For example, the selective replacement of pairs of consecutive "ones" in an incoming data stream by pair of "zeroes" without an intervening sync bit may be useful in alleviating a problem common in the recording art known as "bit-shifting." Bit-shifting occurs when the flux patterns recorded for adjacent "ones" interact causing the recorded patterns to move apart and shift the recorded flux positions from the center of the bit cell. In severe cases the shift may be so great as to prevent the reading circuitry from recognizing the shifted bits as "ones." A reading error thereby results. The problem is most serious when data patterns such as φ11φ or φ1111φ must be recorded. When my inventive method of recording data disclosed here in applied to these patterns the patterns actually recorded on the medium are φφφφ and φφφφφφ respectively. In these patterns the flux transitions are spread further apart resulting in less interaction and less shifting. Other uses for my inventive method and apparatus will also be obvious to those skilled in the art.

What is claimed is:

1. A self-clocking method for recording binary data sequentially in successive clock bit cells on a storage medium wherein a logical first bit state is recorded as a signal transition positioned approximately at the center of its respective bit cell and a logical second bit state is recorded as an absence of a signal transition in its respective bit cell and a signal transition is normally recorded at the bit cell boundary between two successive second bit states, comprising the steps of:
  (a) detecting the occurence of a data sequence consisting of a second bit state followed by four first bit states, followed by a second bit state, and
  (b) recording said data sequence on said medium as a signal transition sequence consisting of six bit cells having signal transitions at the bit cell boundary between the first and second bit cells, the third and fourth bit cells and the fifth and sixth bit cells.

2. A method in accordance with claim 1 wherein the recorded signal is decoded by deriving a timing signal from recorded signal transitions to define bit cells, monitoring bit cells to detect two consecutive bit cells having no signal transitions therein and no signal transition at the boundary between the two consecutive bit cells, and indicating two first bit states corresponding to the two consecutive bit cells.

3. A method in accordance with claim 2 wherein the recorded signal transitions are separated into a data signal by detecting the presence or absence of signal transitions within a bit cell and a sync signal by detecting the presence or absence of signal transitions at bit cell boundaries and the bit cells are monitored by temporarily storing the data signal and the sync signal and examining the stored values.

4. In a system for storing binary data on a storage medium having apparatus for recording signal transitions representing said data sequentially in successive clock bit cells on said medium wherein a logical first bit state is recorded as a signal transition positioned approximately at the center of its respective bit cell and a logical second bit state is recorded as an absence of a signal transition in its respective bit cell and a signal transition is normally recorded at the bit cell boundary between two successive second bit states, the combination comprising means responsive to said data for detecting a data sequence consisting of a second bit state, followed by four first bit states, followed by a second bit state, and means responsive to the detection of said data sequence for recording on said medium a signal transition sequence representing said data sequence, said signal transition sequence consisting of six bit cells having signal transitions at the bit cell boundary between the first and second bit cells, the third and fourth bit cells and the fifth and sixth bit cells.

5. The combination in accordance with claim 4 wherein said recording means comprises means responsive to the detection of said data sequence for generating signal transitions at every other bit cell boundary and means responsive to the detection of said data sequence for disabling said generating means after three transitions have been generated.

6. In a system for storing binary data on and reproducing data off of a storage medium, said system having means for recording signal transitions representing said data sequentially in successive clock bit cells on said medium wherein a logical first bit state is recorded as a signal transition position approximately at the center of its corresponding bit cell and a logical second bit state is recorded as an absence of a signal transition in its corresponding bit cell and a signal transition may be recorded at the bit cell boundary between two successive second bit states, decoding apparatus comprising means responsive to said signal transitions recorded on said medium for deriving a timing signal to define bit cells, means responsive to said timing signal and to said signal transitions for generating a setting signal when two successive bit cells having no signal transition therein and no signal transition at the bit cell boundary therebetween are detected, and means responsive to said setting signal for reproducing a logical first bit state corresponding to each of said two successive bit cells.

7. Decoding apparatus according to claim 6 wherein said means for generating said setting signal comprises means responsive to said timing signal and to said signal transitions for producing a data signal having a first value when a signal transition occurs approximately at the center of a bit cell and having a second value when no signal transition occurs during a bit cell, means responsive to said timing signal and to said signal transitions for producing a sync signal when a signal transition occurs at the boundary of a bit cell, means responsive to said data signal for generating a consecutive zeroes signal when said data signal assumes its second value for a first and a second consecutive bit cells, means responsive to said sync signal and to said timing signal for generating an indicator signal when there is no sync signal corresponding to the bit cell boundary between said first and said second consecutive bit cells, and means responsive to said consecutive zeroes signal and said indicator signal for generating said setting signal.

8. Decoding apparatus according to claim 7 wherein said reproducing means comprises means responsive to said data signal for temporarily storing the value of said data signal occurring during said first and said second consecutive bit cells, and means responsive to said setting signal for forcing the temporarily stored values of said data signal to said first value.

9. Decoding apparatus according to claim 8 wherein said means for generating said consecutive zeroes signal comprises shift register means having a plurality of sequential stages and being responsive to said timing signal and to said data signal for sequentially storing a value of said data signal corresponding to one consecutive bit cell in each of said stages, and means connected to two sequential stages in said shift register and responsive to a second value of said data signal stored therein for generating said consecutive zeroes signal.

10. In a system for storing and retrieving binary data on a storage medium wherein at least two different arrangements are used to encode said data at plural densities, one of said encoding arrangements representing said data sequentially in successive clock bit cells on said medium in which a logical first bit state is recorded as a signal transition positioned approximately at the center of its respective bit cell and a logical second bit state is recorded as an absence of a signal transition in its respective bit cell and a signal transition is normally recorded at the bit cell boundary between two successive second bit states, apparatus for preventing data encoded in said one encoding arrangement from aliasing data encoded in another of said different encoding arrangements, said apparatus comprising means responsive to said data for detecting an incoming data sequence consisting of a second bit state, followed by four first bit states, followed by a second bit state, means for recording on said medium a signal transition sequence representing said data sequence, said signal transition sequence consisting of six bit cells having signal transitions at the bit cell boundary between the first and second bit cells, the third and fourth bit cells and the fifth and sixth bit cells, and means for decoding signal transitions recorded on said medium comprising means responsive to said signal transitions recorded on said medium for deriving a timing signal to define bit cells, means responsive to said timing signal and to said recorded signal transitions for indicating a first bit tate when a signal transition is detected at approximately the center of a bit cell, means responsive to said timing signal and to said recorded signal transitions for indicating a second bit state when no signal transition is detected in a bit cell, means responsive to said timing signal and to said signal transitions for generating a setting signal when two successive bit cells having no signal transition therein and no signal transition at the bit cell boundary therebetween are detected, and means responsive to said setting signal for reproducing a first bit state corresponding to each of said two successive bit cells.

11. Apparatus according to claim 10 wherein said means for generating said setting signal comprises means responsive to said timing signal and to said signal transitions for producing a data signal having a first value when a signal transition occurs approximately at the center of a bit cell and having a second value when no signal transition occurs during a bit cell, means responsive to said timing signal and to said signal transitions for producing a sync signal when a signal transition occurs at the boundary of a bit cell, means responsive to said data signal for generating a consecutive zeroes signal when said data signal assumes its second value for a first and a second consecutive bit cells, means responsive to said sync signal and to said timing signal for generating an indicator signal when there is no sync signal corresponding to the bit cell boundary between said first and said second consecutive bit cells, and means responsive to said consecutive zeroes signal and said indicator signal for generating said setting signal.

12. Apparatus according to claim 11 further comprising means responsive to said timing signal and said signal transitions for disabling said means for generating said setting signal when said decoding means is decoding data encoded in an encoding arrangement other than said one encoding arrangement.

* * * * *